United States Patent
Doerr et al.

(10) Patent No.: US 6,304,350 B1
(45) Date of Patent: Oct. 16, 2001

(54) TEMPERATURE COMPENSATED MULTI-CHANNEL, WAVELENGTH-DIVISION-MULTIPLEXED PASSIVE OPTICAL NETWORK

(75) Inventors: Christopher Richard Doerr, Atlantic Highlands; Charles H. Joyner, Red Bank Township, Monmouth County; Rene Henri Monnard, Old Bridge Township, Monmouth County; Lawrence Warren Stulz, Shark River Hills; Martin Zirngibl, Middletown Township, Monmouth County, all of NJ (US)

(73) Assignee: Lucent Technologies Inc, Murray Hill, NJ (US)

( * ) Notice: Subject to any disclaimer, the term of this patent is extended or adjusted under 35 U.S.C. 154(b) by 0 days.

(21) Appl. No.: 09/070,608

(22) Filed: Apr. 30, 1998

Related U.S. Application Data
(60) Provisional application No. 60/048,310, filed on May 27, 1997.

(51) Int. Cl.[7] .................................... H04J 14/02

(52) U.S. Cl. .................. 359/130; 359/132; 359/133; 359/124; 359/187; 359/161; 359/110; 359/135; 372/34; 372/23; 385/24; 385/27

(58) Field of Search .................. 359/110, 124, 359/128, 130, 132, 133, 161, 187, 135; 372/34, 23; 385/24, 37, 27

(56) References Cited

U.S. PATENT DOCUMENTS

| | | | |
|---|---|---|---|
| 5,136,671 | * 8/1992 | Dragons et al. | 385/46 |
| 5,299,212 | * 3/1994 | Koch et al. | 372/32 |
| 5,576,881 | * 11/1996 | Doerr et al. | 359/133 |
| 5,617,234 | * 4/1997 | Koga et al. | 359/131 |
| 5,745,275 | * 4/1998 | Giles et al. | 359/187 |
| 5,754,322 | * 5/1998 | Ishikawa | 359/135 |
| 5,907,417 | * 5/1999 | Darcie et al. | 359/110 |
| 5,912,749 | * 6/1999 | Epworth et al. | 359/182 |
| 5,920,414 | * 7/1999 | Miyachi et al. | 359/133 |
| 6,028,881 | * 2/2000 | Ackerman et al. | 372/75 |
| 6,031,644 | * 2/2000 | Utsumi | 359/110 |
| 6,043,915 | * 3/2000 | Giles et al. | 39/132 |
| 6,185,022 | * 2/2001 | Harasawa | 359/124 |
| 6,192,170 | * 2/2001 | Komatsu | 385/15 |

OTHER PUBLICATIONS

C. R. Giles, R. D. Feldman, T. H. Wood, M. Zirngibl, G. Raybon, T. Strasser, L. Stulz, A. McCormick, C. H. Joyner, and C. R. Doerr, "Access PON using downstream 1550–nm WDM routing and upstream 1300–nm SCMA combining through a fiber–grating router," *IEEE Photon. Technol. Lett.*, vol. 8, No. 11, pp. 1549–1551, 1996.

M. Zirngibl, B. Glance, L. Stulz, C. H. Joyner, G. Raybon, and I. P. Kaminow, "Characterization of a multiwavelength waveguide grating router laser," *IEEE Photon. Technol. Lett.*, vol. 6, No. 3, pp. 1982–1084, 1994.

(List continued on next page.)

*Primary Examiner*—Leslie Pascal
*Assistant Examiner*—Chau M. Nguyen
(74) *Attorney, Agent, or Firm*—John A. Caccuro (57) ABSTRACT

Temperature compensation of a wavelength-division-multiplexed (WDM) passive optical network (PON) communication system uses power measurements from each of it remote nodes (RNs) to adjust the frequency of an associated multifrequency laser (MFL). Changes in the power level at each RN caused by frequency drift of its waveguide grating router (WGR), due to changes in the WGR temperature, is determined by monitoring the power level received at each RN and corrected by appropriate changes in the temperature of the associated MFL. The WGR uses one output port (e.g., channel 1) which is looped-back through the WGR a second time to increase the temperature sensitivity of the power measurements. A temperature-control algorithm controls the temperature of the MFL as a function of changes in the received power at the WGR.

17 Claims, 8 Drawing Sheets

OTHER PUBLICATIONS

M. Zirngibl, C. H. Joyner, L. Stulz, C. Dragone, H. M. Presby, and I. P. Kaminow, "LARNet, a local access router network," *IEEE Photon. Technol. Lett.,* vol. 7, No. 2, pp. 215–217, 1995.

R. Giles and S. Jiang, "Fiber grating sensor for wavelength tracking in single–fiber WDM access PON's," *IEEE Photon. Technol. Lett.,* vol. 9, No. 4, pp. 523–525, 1997.

R. Monnard, C. R. Doerr, C. H. Joyner, M. Zirngibl, and L. W. Stulz, "Direct modulation of a multifrequency laser up to 16×622 Mb/s," *IEEE Photon. Technol. Lett.,* vol. 9, No. 6, pp. 815–817, Jun. 1997.

D. Mayweather, L. Kazovsky, M. Downs, and N. Frigo, "Wavelength tracking of a remote WDM Router in a passive optical network," *IEEE Photon, Technol. Lett.,* vol. 8, No. 9, pp. 1238–1240, 1996.

* cited by examiner

TEMPERATURE COMPENSATED MULTI-CHANNEL, WAVELENGTH-DIVISION-MULTIPLEXED PASSIVE OPTICAL NETWORK

RELATED APPLICATIONS

This application is based on and claims the priority date of a provisional application, Ser. No. 60/048,310 filed on May 30, 1997 and entitled "NOVEL MULTI-CHANNEL, WAVELENGTH-DIVISION-MULTIPLEXED PASSIVE OPTICAL NETWORK."

GOVERNMENT CONTRACT

This invention was made with government support. The government has certain rights in this invention.

TECHNICAL FIELD OF THE INVENTION

This invention relates to a multi-channel, wavelength-division-multiplexed (WDM) passive optical network (PON) communication system and, more particularly, to a method and apparatus for the temperature compensating of such networks using a waveguide grating router (WGR) for detecting the power received at the routing networks of such a system.

BACKGROUND OF THE INVENTION

Passive optical networks (PON) have gained much interest in the past years because of their fiber gain, broadband capability, and unpowered outside plant which reduces maintenance cost [1]. (Note that in the above and following description, a reference's identification [e.g., 1] refers to that reference's location in the Appendix) Generally, PONs can be either time division multiplex (TDM), wavelength division multiplex (WDM) or both. In a TDM PON, the signals, which are electronically multiplexed at the Central Office (CO), are equally split at the remote node (RN) by a passive power splitter among all the optical network units (ONU) where they are electronically demultiplexed. The receivers at each ONU have to process the information at the aggregate bit-rate. Furthermore, the optical signal power coming from the CO is attenuated at the RN because of the splitting loss. In WDM PONs, each ONU is assigned a different wavelength, which is passively demultiplexed at the RN by a router. This provides a virtual point-to-point connectivity which also means that the receiver and the transmitter do not operate at the aggregate bit-rate. Such a system allows high flexibility in bandwidth allocation and upgradability for individual ONUs or for the whole system. However, one of the prices to pay for this flexibility is wavelength management. Each wavelength must be precisely spaced and aligned with the router. The multifrequency laser (MFL) provides a precise channel spacing due to its internal waveguide grating router (WGR) which acts as an intra cavity filter [2]. The WGR also provides single-knob wavelength comb tunability by changing the device temperature alone, simplifying the locking of the MFL source wavelengths to the passive WGR demultiplexer at the RN, which drifts due to temperature changes of the uncontrolled outside plant. What is needed is a practical and reliable way to lock the MFL wavelength frequencies to the WGR demultiplexer with temperature changes in the outside plant (i.e., WGR).

SUMMARY OF THE INVENTION

The present invention solves the prior art problems using a novel method and apparatus for temperature compensation of a multi-channel, wavelength-division-multiplexed (WDM) passive optical network (PON) communication system. In accordance with the present invention, changes in the power level at each remote node (RN) caused by frequency drift of its waveguide grating router (WGR), due to changes in its temperature, can be determined by monitoring the power level received at RN and corrected by appropriate changes in the temperature of the multifrequency laser (MFL). Our invention, uses a WGR where one output port (e.g., channel 1) is looped-back through the WGR a second time to increase the temperature sensitivity of the received power measurements.

More particularly, in accordance with the present invention, a WDM communication system comprises a transmitter unit a receiver unit and a controller. The transmitter includes (1) a temperature sensitive multifrequency laser MFL for transmitting a multifrequency laser signal over an optical facility, and (2) a controller for controlling the temperature of the multifrequency laser in response to a power level signal received over a facility from a WDM receiver unit. The receiver unit includes a WGR apparatus comprising (1) a first input port of the WGR for receiving a wavelength division multiplexed (WDM) signal having a plurality of wavelengths signals, each wavelength being demultiplexed by the WGR and outputted at a separate first type output port of a plurality of first type output ports, (2) a second input port of the WGR arranged to communicate a preselected wavelength signal to a second type output port and (3) wherein a preselected one of the plurality of first type output ports is connected to the second type output port, so that a preselected wavelength signal received at the selected first type output port is outputted from the second input port. The controller receives the preselected wavelength signal, detects its power level and sends the received power level signal to the WDM transmitter unit.

In a single receiver WDM system, the controller may be located at the receiver and in a multiple receiver system the controller may be located at a separate location or at one of the receiver locations. According to one aspect of the invention, the temperature controller includes a temperature control algorithm for controlling the temperature of the MFL as a function of the received power at the WGR of the WDM receiver unit. According to another aspect, the MFL includes a WGR which is the same type as the WGR of the WDM receiver unit.

DETAILED DESCRIPTION

In the following description, each item or block of each figure has a reference designation associated therewith, the first number of which refers to the figure in which that item is first located (e.g., 101 is located in FIG. 1).

Figure 1:
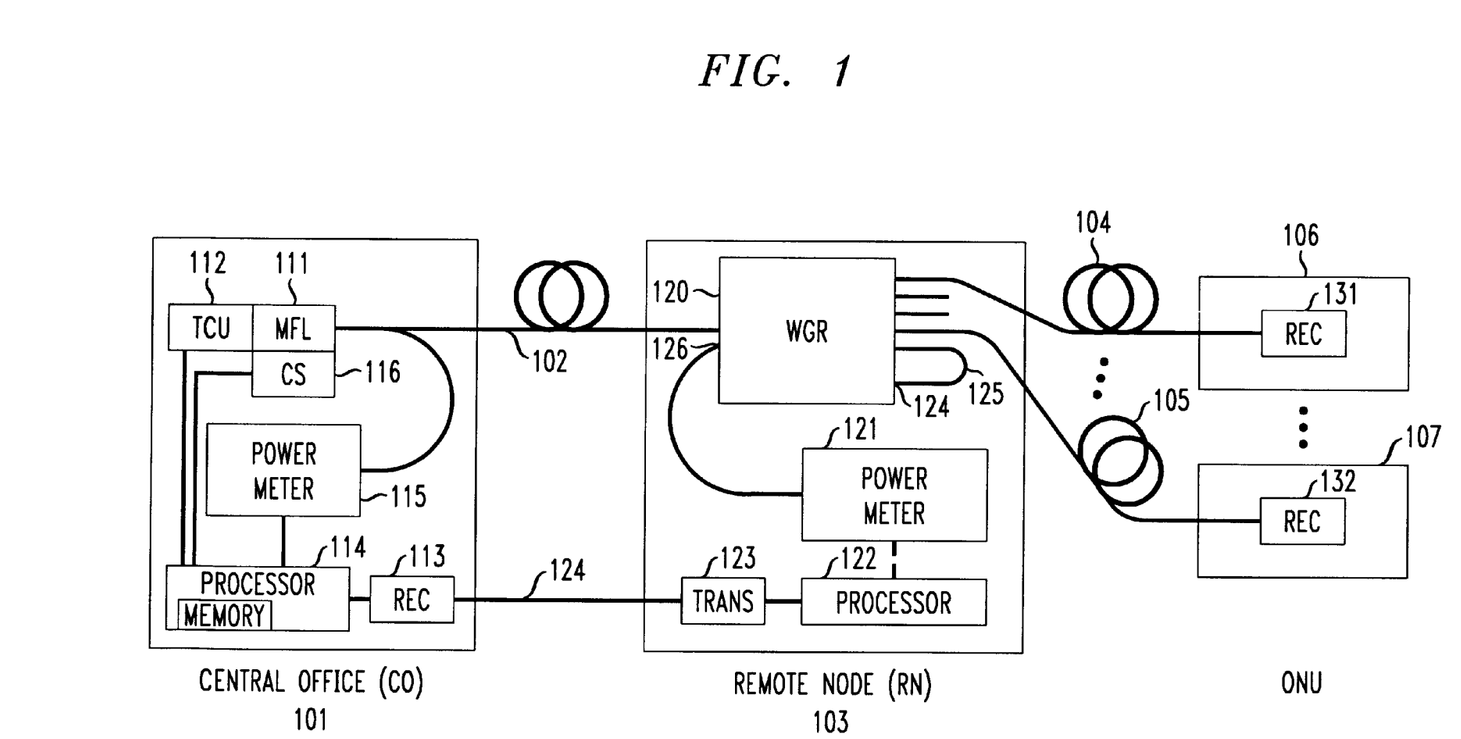
FIG. 1 shows a block diagram of an illustrative WDM passive optical network (PON) useful in describing the present invention, the WDM PON including a central office (CO) connected via a remote nodes (RN) to a plurality of optical network units (ONUs)

A WDM PON system for illustrating the operation of the present invention is schematically shown in FIG. 1 and represents the downstream part [3]. With reference to FIG. 1, the central office (CO) 101 connects via standard single-mode fiber 102 to the remote node (RN) 103. The RN 103 is shown to connect via a plurality of optical fibers 104–105 to a plurality of ONUs 106–107. Illustratively, the optical fiber 102 is 43 km in length and the optical fiber 104 is 20 km in length.

The CO 101 includes a multifrequency laser (MFL) 111 based on a 16-channel chirped router design with 200 GHz channel spacing and no shared amplifier served as the CO WDM transmitter [6]. The MFL 111 can also be of the type described in U.S. Pat. No. 5,576,88, entitled "MULTIFREQUENCY OPTICAL SIGNAL SOURCE HAVING REDUCED DISTORTION AND CROSSTALK" issued on Nov. 19, 1996 to C. R, Doerr et al.

Figure 6:
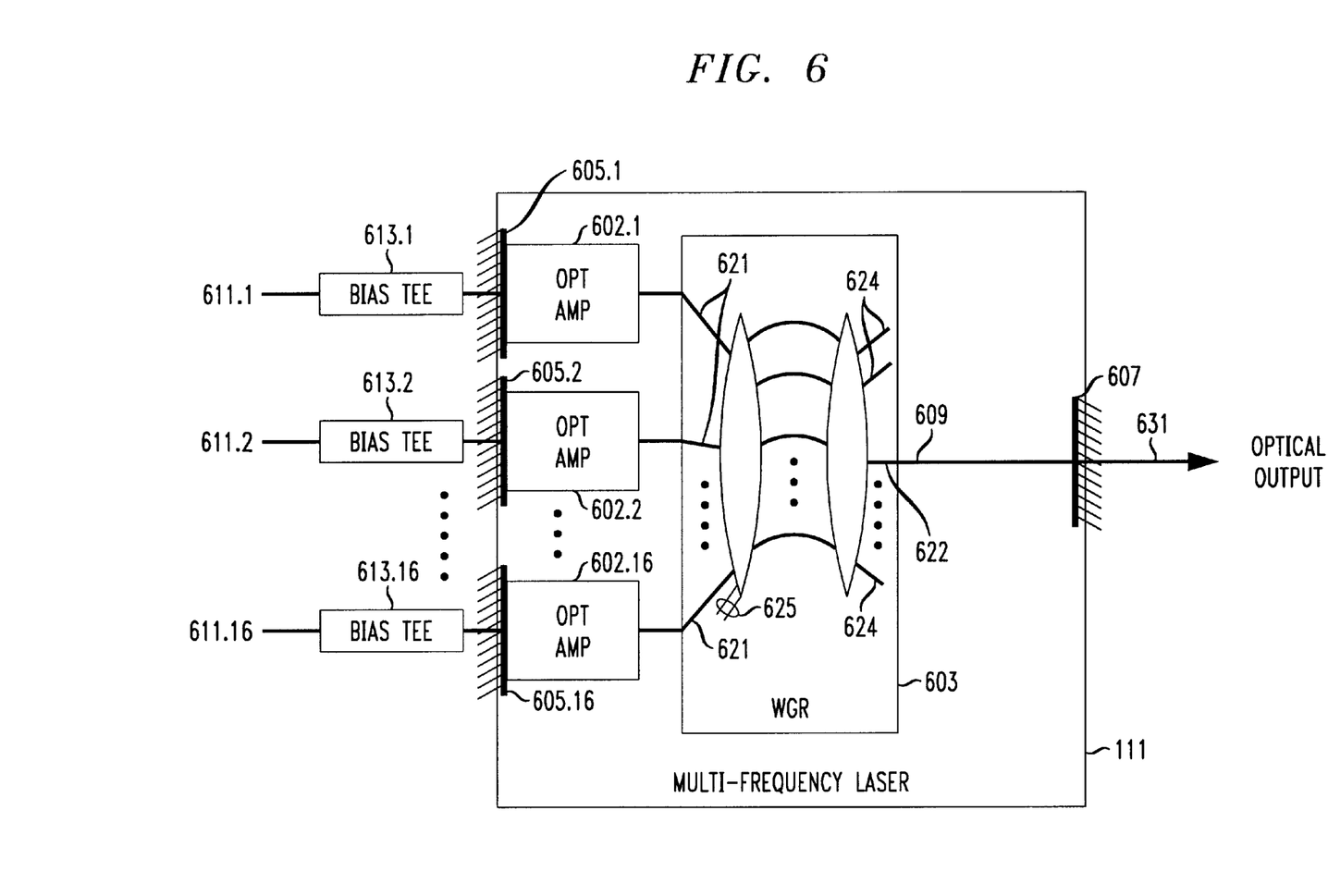
FIG. 6 shows an illustrative multi-frequency laser (MFL) which may be utilized in the CO of FIG. 1.

With reference to FIG. 6 there is shown an illustrative multi-frequency laser (MFL) 111 which may be utilized in the CO 101 of FIG. 1. The illustrative MFL is shown to be a sixteen-channel MFL (sixteen separate lasers in this example) with 200 GHz spacing between frequencies The MFL 111 shown is a multiplexed intra-cavity type described in the above-referenced Doerr et. al. patent. The MFL includes reflectors 605.1–605.16, semiconductor optical amplifiers 602.1–602.16, waveguide grating router (WGR) 603, and reflector 607. Each of the reflectors 605.1–605.16 together with their respective path 621 through WGR 603 to reflector 607 form the cavity for each laser. Each of the electronic signals 611.1–611.16 are used to modulate a different laser of MFL 603 via a respective bias tee 613.1–613.16. The MFL 111 may be implemented using a WGR 603 illustratively formed in Indium Phosphide (InP) with an array of multiple quantum well (MQW) semiconductor amplifiers 602.1–602.16 located on one side of WGR 603. Such a WGR may be of the type described in U.S. Pat. No. 5,136,671, issued to C. Dragone on Aug. 4, 1992. The WGR 603 may or may not be of the same type as the WGR 120 used at RNs 106–107.

The frequencies (or wavelengths ) generated by MFL 111 vary with temperature. A temperature control unit 112 located at CO 101 controls the temperature of MFL 111. A receiver 113 detects RN power data received over a communication facility from RN 103. The processor 114 processes the RN power data from the receiver 113 and sends appropriate control signals to temperature control unit 112 to control the operating temperature of MFL 111. The power meter 115 monitors the power level of the frequencies generated by MFL 111 and sends information to processor 114 which adjusts each amplifiers (602.1–602.16 of FIG. 6) dc bias current through multiple current source 116.

The RN 103 includes a waveguide grating router (WGR) 120, power meter 121, processor 122 and transmitter 123. Typically, RN 103 is located in a remote location that is not a temperature controlled environment. As the temperature of WGR 120 varies the passbands of WGR 120 shift in frequency. In accordance with the present invention, we use one output port (e.g., channel 1) of WGR 120 which is looped-back 125 through WGR 120 a second time and measure the optical power at the corresponding "input" port 126, which gives signal-loss information about WGR 120. It should be noted that WGR 120 (like WGR 603 shown in FIG. 6) is arranged with extra inputs (output) ports 625 and output (input) ports 624 which can be used when the WGR is used as a multiplexer (demultiplexer). For example, our WGR 120 demultiplexer uses one of the extra output ports 625 to receive the loop-back connection 125 of channel 1. One of the extra input ports 124, the one that would receive the channel 1 frequency after it is looped-back, would then be connected to power meter 121. This double-pass through WGR 120 increases the temperature versus loss sensitivity measurements of WGR 120. The power meter 121 detects the power level at port 126. The processor 122 receives power readings from power meter 121 and sends them via transmitter 123 and facility 124 to CO 101. While the power readings are shown as being sent over a separate facility 124, it should be apparent that if the facility 102 is bidirectional (e.g., using different wavelengths for each direction), the power readings can also be sent back to the CO 101 over the same facility 102.

Each of the ONUs 106–107 is shown to include a receiver (REC) 131–132, respectively, which, illustratively, may be a pin-FET receiver.

With continued reference to FIG. 1, the operation of the present invention is described. At the CO 101, N different modulated wavelengths are generated by MFL 111 and coupled into a single mode fiber 102. The WGR 120 at the RN 103 optically demultiplexes the signals and sends them to different ONUs, 106–107 where each signal is received. The CO 101 is linked to the RN by 43 km of standard single-mode fiber and the RN 103 is linked to the ONUs by 20 km of standard single-mode fiber. No isolator was used in our WDM PON. The channel powers generated at the CO 101 is monitored by power meter 115. This could be done by using a photodiode and a correlation technique [4]. For convenience, we used an optical spectrum analyzer instead. There are different ways for temperature tracking WGR 120 [5]; we choose to monitor the optical power at one of the WGR 120 outputs. Details of the operation of our illustrative temperature compensated WDM PON will be discussed in later paragraphs.

In our illustrative system of FIG. 1, a wavelength division multiplexed (WDM) passive optical network (PON) operating at 155 Mb/s with 63 km of standard single mode fiber (102 plus 104) was demonstrated under simulated outside plant temperature conditions. The multifrequency laser (MFL) 111 was used as the transmitter and a waveguide grating router (WGR) 103 as the demultiplexer. In accordance with the present invention, changes in the power level at each RN 103 caused by frequency drift of its WGR 120, due to changes in its temperature, can be determined by monitoring the power level received at RN 103 and corrected by appropriate changes in the temperature of the MFL 111.

A 20° C. per hour temperature change of WGR 103 was tracked (i.e., compensated for) by changing the MFL 111 temperature and resulted in a power penalty in the detected bit error rate of less than 0.75 dB. An MFL based on a 16-channel chirped router design with 200 GHz channel spacing and no shared amplifier served as the CO WDM transmitter [6]. At the RN, we used an 8×24 WGR 120 with 200 GHz channel spacing, placed in an oven in order to have a controllable temperature to simulate outside plant conditions. At the ONU 106, we used a commercial pin-FET receiver 131 with 135 MHz bandwidth.

Figure 2:
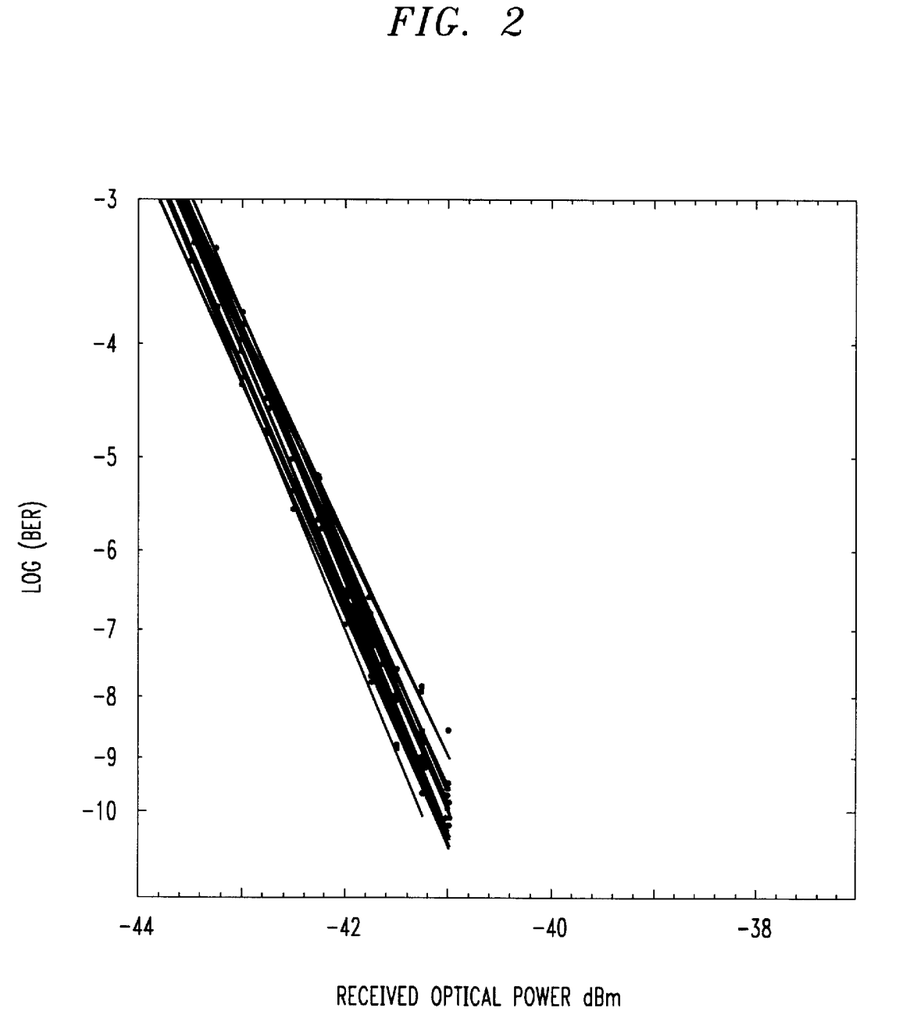
FIG. 2 shows the measured bit-error-rate (BER) against received optical power for each of 16 channels individually modulated and going through the WGR (no fiber)

We performed bit-error-rate (BER) measurements at 155 Mbps for each channel signal with a $2^{15}$ long pattern ($2^{15}-1$ pseudo random pattern and adding a zero to the longest zero sequence) which were shifted by at least 8 bits between different channels. The modulation amplitude was 2 volts peak-to-peak for all channels. To determine the baseline sensitivities, we first measured the back-to-back BER against received optical power for each channel running alone and then going through the WGR. FIG. 2 shows the BER against received optical power for each of 16 channels individually modulated and going through the WGR (no fiber). We adjusted the MFL output power for each channel to optimize the performance. When the MFL's temperature is maintained at 16° C. and WGR's at 60° C., nearly the same BER performances are achieved by all 16 channels (FIG. 2); the output power varies between −13 and −9 dBm depending on the channel. It is important to note that the channel frequencies move together as a comb; thus one parameter suffices to align all 16 MFL channels to 16 of the WGR channels (120 in FIG. 1).

Figure 3:
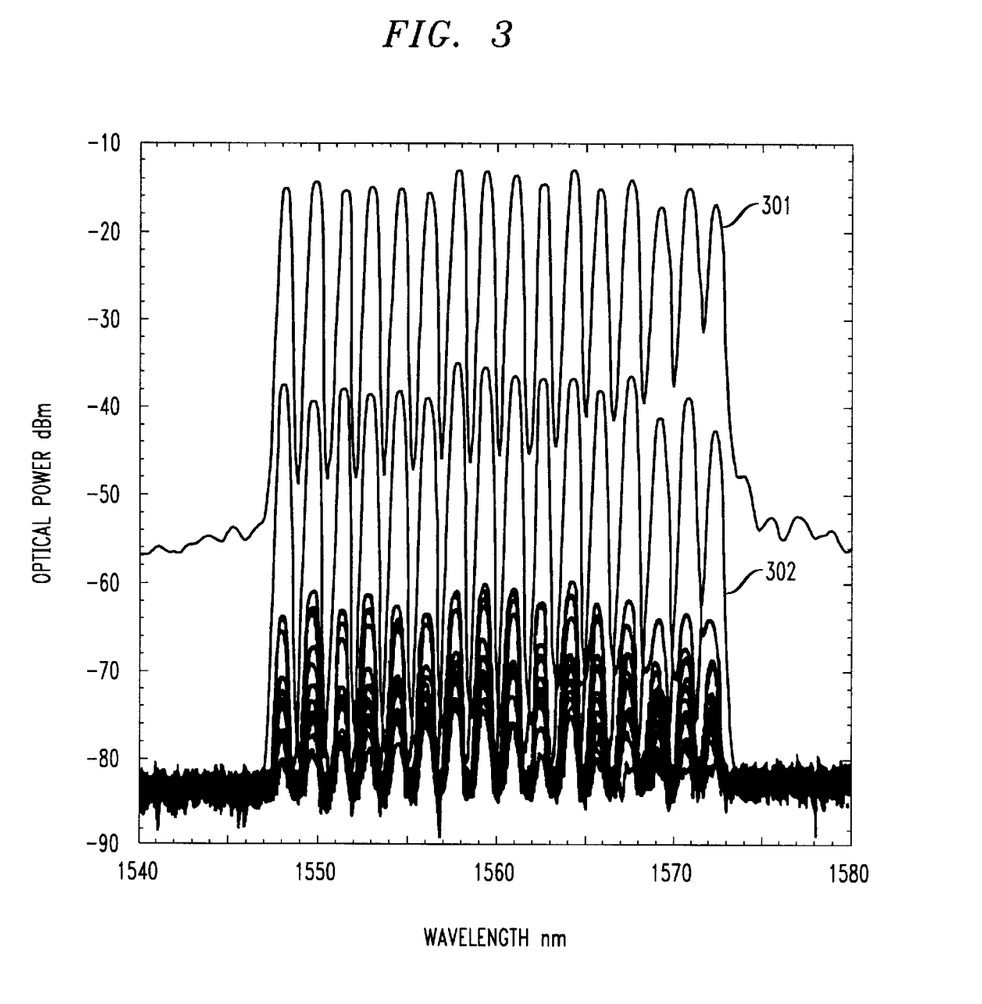
FIG. 3 shows the optical spectrum for 16 simultaneously modulated channels with different optical power at the output of the laser (upper spectrum), and optical spectrum at the 16 ONUs.

We then measured the BER of our WDM PON shown in FIG. 1. All channels were simultaneously modulated, and the optical power of each channel is individually adjusted to optimize the performance. We use the same procedure as described in reference [6] to adjust the DC bias on each channel to stabilize its optical power. FIG. 3 shows the optical spectrum at the output of the MFL for 16 simultaneously modulated channels with different optical power at the output of the laser (upper spectrum 301), and optical spectrum at the 16 ONUs (lower spectrum 302). As shown, the optical losses are between 22 and 23 dB including the losses from an optical switch placed after the WGR and an optical attenuator (both are not shown in FIG. 1). We can also see in FIG. 3 that the crosstalk from nearest neighbors is less than −20 dB; we typically measured a 17 dB signal-to-total crosstalk ratio.

Figure 4:
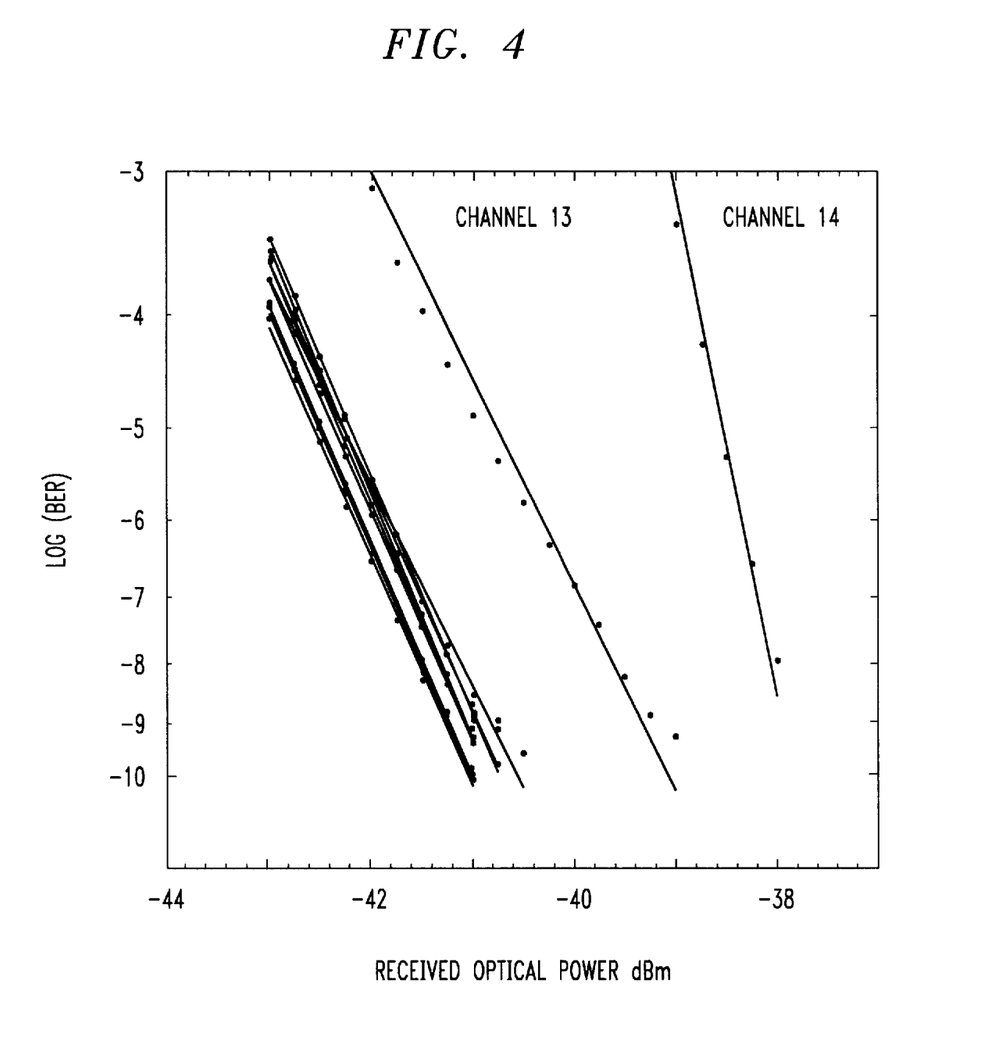
FIG. 4 shows the BER against received optical power at the ONU for the 14 first channels simultaneously modulated.

In FIG. 4, the BER was measured against received optical power at the ONU for the first 14 channels simultaneously modulated. We obtained error-free performance for the first 13 channels, and the first 12 channels were almost without power penalty when compared to the baseline sensitivity. Although we could modulate each of the 16 channels individually and measure the same BER against received optical power, running all the channels simultaneously decreases each amplifiers performance because of mutual heating. The 4 outermost channels suffer from larger intra-cavity losses and filter bandwidths due to our first non-optimal WGR chirp design. The double-chirp design solves this passband nonuniformity problem [7].

Shown below in Table 1 is the various power levels and losses for our measurements on our system of FIG. 1.

TABLE 1

Power budget for our WDM PON downstream signal.

| | |
|---|---|
| Launched power: | −13 to −10 dBm |
| Couplers | −1 dB |
| 60 km of SM fiber | −12 dB |
| WGR | −7 dB |
| Received power at the ONU | −33 to −30 dBm |

As shown the launched power is −13 to −10 dBm. The couplers have a 1 dB loss, the 60 km of SM fiber has 12 dB loss, and the WGR has 7 dB loss. The power budget for our WDM PON results in a signal of −30 to −33 dBm at the ONU 106, which gives a comfortable margin with a sensitivity of −39 dBm for commercial pin-FET receiver 132. Some of this power margin can be used to insert additional devices needed for upstream signals, such as wavelength selective couplers. On the other hand, the MFL 111 optical power per channel can still be improved by about 10 dB through better heat-sinking of the individual amplifiers. Moreover, there are additional losses which arise during ultraviolet-curing of the fiber 102 attachment connection to MFL 111.

Figures 5A, 5B:
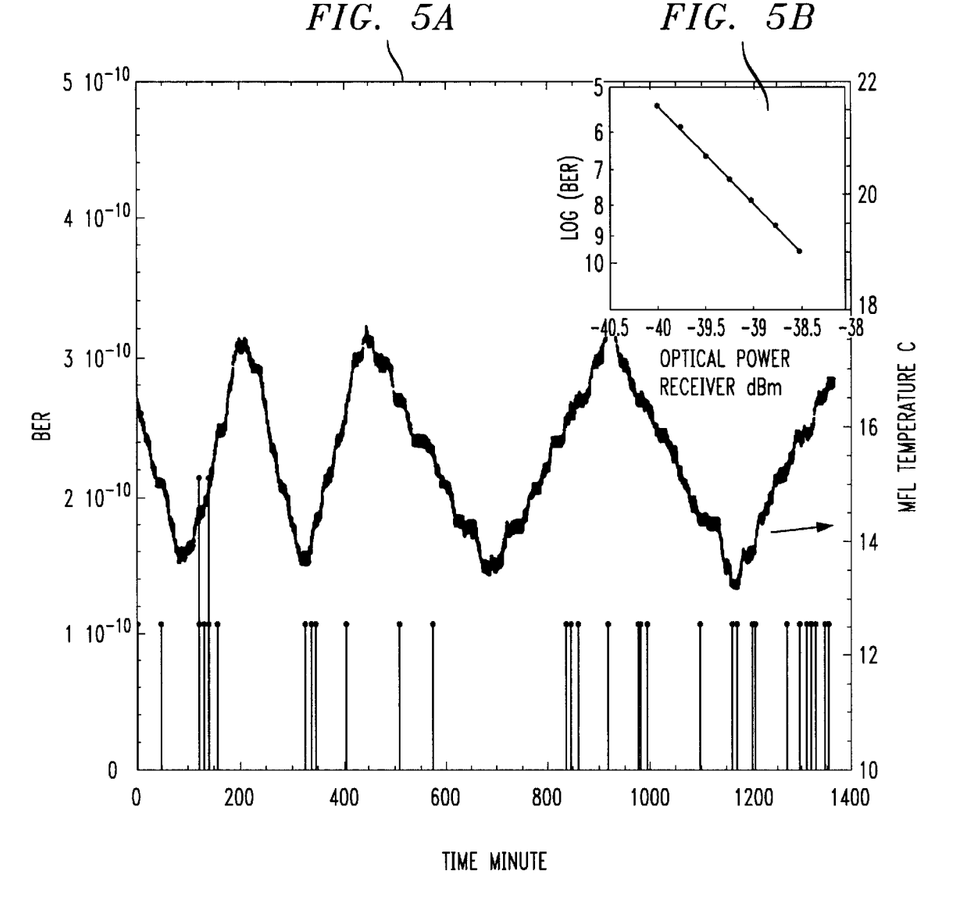
FIG. 5 shows the BER against received optical power at a ONU in FIG. 5a and with a full receiver (clock recovery) in FIG. 5b. The BER is taken each minute (circle) and MFL temperature during tracking and all channel are running.

At the RN 103, the WGR 120 is temperature dependent, so that the transmitter wavelength comb has to track the WGR comb. We simulated the temperature change at the RN 103 by changing the oven temperature between 40 and 80° C. at a rate of 10 to 20° C. per hour. We used channel 1 of the WGR 120 output port to loop back, 125, from the WGR 120 and measured the optical power at the corresponding "input" port, which gives information about the WGR losses. As noted, this double pass in the WGR 120 increases the temperature versus loss sensitivity. We used only the first 12 channels in this tracking experiment. Every ~100 seconds, we changed the MFL 111 temperature by ±0.1° C. depending on the two previous WGR 120 loss measurements. This time interval is sufficient to readjust each channels dc bias to keep the optical power per channel constant. The maximum power difference measured for each channel is ±0.2 dB of its target value. The signal phase shift due to the fiber dispersion in this experiment forced us to recover the clock signal at the receiver. FIG. 5a shows the BER against received optical power at ONU 8. The BER was taken each minute (circle) and MFL 111 temperature during tracking and all channel are running. FIG. 5b shows the BER against received optical power for our complete receiver with data retiming and clock recovery for channel 8. FIG. 5 shows the MFL 111 temperature from 13.2 to 17.8° C. and the channel 8 BER measurements keeping the optical power at the receiver constant at −38 dBm. This is 0.7 dB more optical power than needed for a $10^{-9}$ error rate. Similar results were obtained with all other channels.

Figure 7:
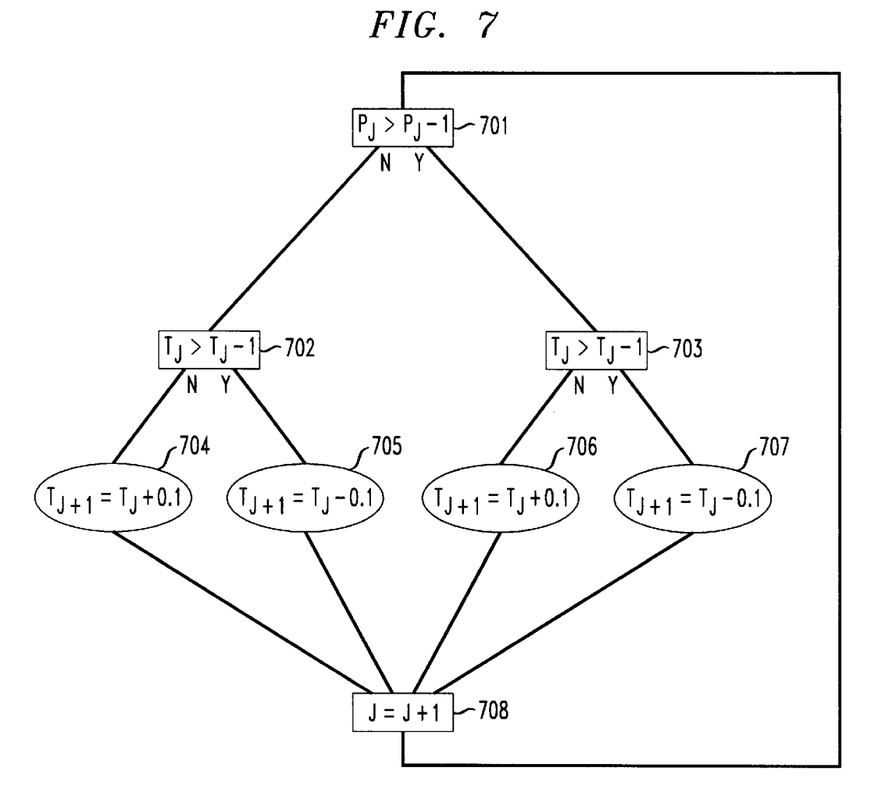
FIG. 7 shows an illustrative MFL temperature control algorithm which enables the MFL frequencies to track the channels of WGR demultiplexer.

With this tracking arrangement, we showed that the MFL 111 wavelength comb can simply be tuned, and the resulting frequencies of MFL 111 changed, by adjusting its temperature without generating errors. With reference to FIG. 7 we describe our illustrative MFL temperature control algorithm which enables the MFL 111 frequencies to track the channels of the WGR 120 demultiplexer. The following description also makes reference to FIG. 1 and to FIG. 8 which shows an illustrative plot of the output signal level variation versus wavelength for one channel of WGR 120.

Figure 8:
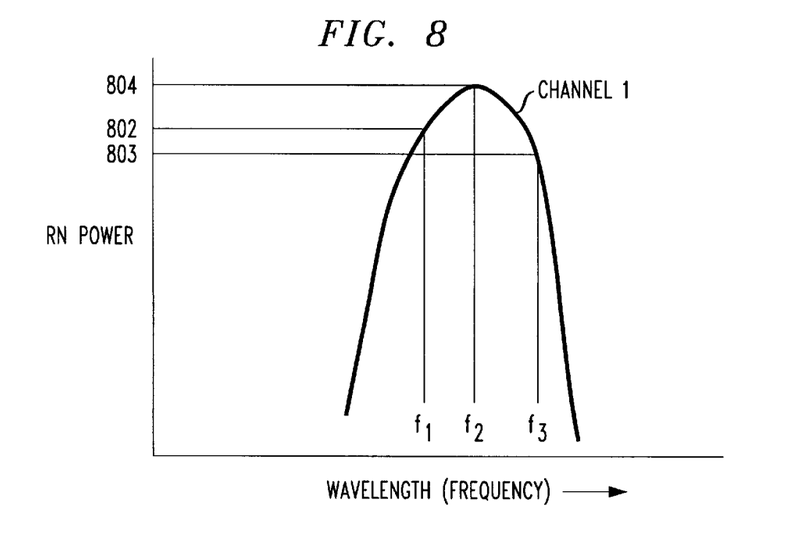
FIG. 8 shows an illustrative plot of the output signal level variation versus wavelength for one channel of a WGR.

The algorithm of FIG. 7 is stored in processor's 114 memory along with prior and current temperature data and power sample measurements and other parameters and data used by the algorithm. The description begins by assuming that existing MFL temperature data and RN power level data have already been stored in memory. In step 701, processor 114 of CO 101 obtains a power reading from processor 122 of RN 103 and determines if the RN power level at this sample point (J) is greater than the power reading at a prior sample point (J−1). With particular reference to FIG. 8, we assume that the prior RN power reading is at 802 indicating that the frequency f1 from MFL 111 is no longer at the center of channel 801 of WGR 120. This condition would arise because the temperature of WGR 120 has changed and as a result so has the frequency location of channel 1 of WGR 120. The object of our algorithm is to change the temperature of MFL 111 so that the resulting channel 1 frequency of MFL 111 falls in the center of the channel 1 band, 801, of WGR 120. This occurs by increasing the frequency f1 of MFL 111 to a frequency f2 so that it lies in the center of channel 1. The algorithm basically keeps changing the temperature of MFL 111 in the same direction as long as the power levels keep rising, and if the power level falls the temperature change is reversed to attempt to raise the power level. If we assume, in FIG. 8, that channel 1 used to be centered around frequency f, but because of a temperature change at WGR 120 the center frequency of channel 1 has drifted, i.e., increased, then as a result the received power level at RN decreases from level 804 to 802. Then in step 701 it is determined that the present power level $P_J$ is not greater than the prior power level $P_{J-1}$. Thus, the results of the step 701 test is "no," and control passes to step 702. In step 702, the processor 114 compares the present temperature data $T_J$ with prior temperature data $T_{J-1}$. If the results of step 702 is "no," that is the prior temperature was higher, this would indicate that the temperature of MFL 111 should be raised ($T_{J+1}=T_J+0.1$) in step 704 to increase the frequency f1 and hence the power at RN 103 (i.e., increase the frequency f1 toward f2 in FIG. 8). If on the other hand, step 702 were true then the temperature of MFL 111 should be reduced ($T_{J+1}=T_J-0.1$) in step 705 to increase the frequency f1 and hence the power at RN 103. After either of the steps 704 or 705, control passes to step 708 where the sample point variable J is increased to J+1 and control returns to step 701 to await the next sample point power data reading from RN 103.

If step 701 were true, then in step 703 processor 114 compares the present temperature data $T_J$ with prior temperature data $T_{J-1}$. If the results of step 703 is "no," that is the prior temperature was higher, this would indicate that the temperature of MFL 111 should be raised ($T_{J+1}=T_J+0.1$) in step 706 to increase the frequency f1 and hence the power at RN 103 (i.e., increase the frequency f1 toward f2 in FIG. 8). If on the other hand, step 703 were true then the temperature of MFL 111 should be reduced ($T_{J+1}=T_J-0.1$) in step 707 to increase the frequency f1 and hence the power at RN 103. After either of the steps 706 or 707, control passes to step 708 where the sample point variable J is increased to J+1 and control returns to step 701 to await the next power data reading from RN 103.

The process of FIG. 7 proceeds in much the same way if the frequency from MFL 111 is above (e.g., f3) the center channel frequency f2 of WGR 120. It should be noted that the sample points J (i.e., when power level readings are sent from RN 103) can occur as a function of time (e.g., periodically with time) or can occur when a predetermined power level change has occurred at RN 103. Additionally, the power and temperature measurements need not be absolute readings but need only be relative ones. So there is no influence from additional loss due to fiber aging or other plant loss changes.

Using our simple tracking algorithm, the MFL 111 can follow the WGR with a temperature change rate at the RN of 20° C. per hour. The maximum tracking rate that can be achieved is dependent on the MFL 111 temperature control (cooling capability), on channel power adjustment method and on wavelength comb misalignment measure between WGR 120 and MFL 111 [8]. The power budget allows us to tap only channel 1 for the tracking experiment. A 16-channel MFL with 275 GHz tuning range capability has already been demonstrated [6], which would represent about 200° C. temperature change at the RN.

Figure 9:
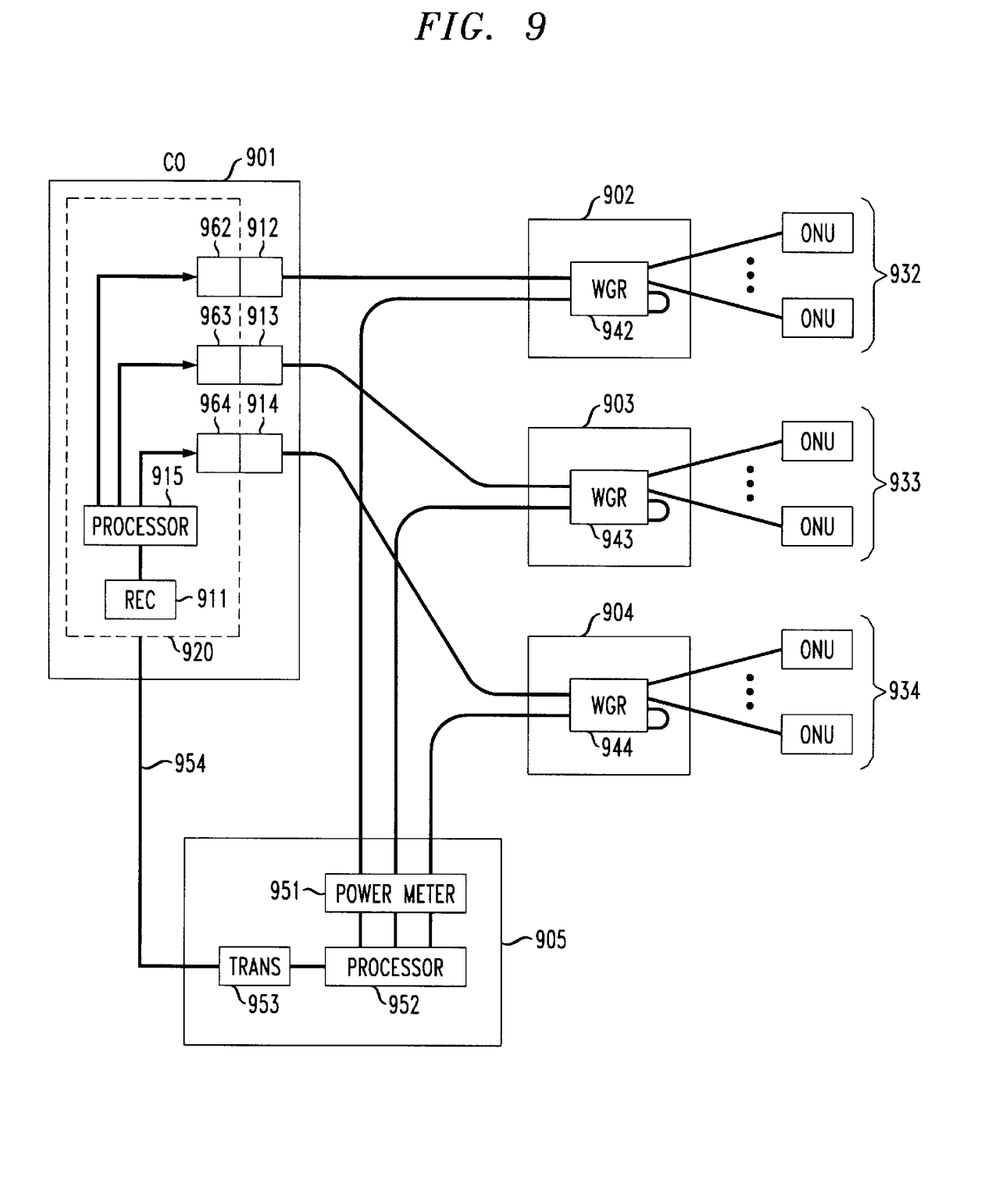
FIG. 9 shows another illustrative WDM PON system having a CO location connected to a plurality of RN locations and arranged to incorporate the present invention.

With reference to FIG. 9, there is shown another illustrative WDM PON system arranged to incorporate the present invention. The CO location 901 connects via a plurality of RN locations 902–904 to the ONUs 932–934. A power detector 905 receives the received signals of the monitored channel from each of the RNs 902–904. One or more power meters 951 are used to detect the signal power levels at each WGR 942–944 at RNs 902–904, respectively. The processor 952 formats the power data from power meter(s) 951 into a suitable form for transmission via transmitter unit 953 over facility 954 to CO 901. While the power detector is shown as located separate from the RN 902–904, it can also be co-located at one of the RN 902–904 locations.

At CO 901, a receiver 911 in controller 920 receives the power data and passes it to processor 915. The processor 915 uses the above-described algorithm to process the power data for each of the RNs 902–904 to determine any temperature adjustment necessary to assure that the wavelength signals from MFL, 912–914 align with the WGR wavelength combs 942–944 at each of the RNs 902–904, respectively. The processor then outputs a control signal to temperature control/multiple current source units 962–964 (i.e., 112 and 116 of FIG. 1) to adjust the temperature of- and dc bias of amplifiers in-its associated MFL 912–914, respectively. The processors 952 and 915, transmitter 953, receiver 911, and temperature control units 962–964 are well known elements that can be utilized to perform the described functions. While the controller 905 has been shown as separate from the WDM receiver locations 902–904, it should be understood that it can be co-located at one of the WDM receiver locations. Additionally, separate power meters can be located at each WDM receiver location 902–904 and power data signals sent to the controller 905 for consolidation and transmission to CO 101.

In conclusion, we have described a 12-channel 63 km-long standard single-mode fiber WDM PON at 155 Mb/s which tracks temperature changes at the WGR of a RN at a rate of 20° C. per hour. Our loop-back technique through the WGR has increased the sensitivity of the temperature monitoring at the RN. Our WDM PON used realistic outside plant devices and a MFL as a multiple channel transmitter.

It should be noted that while WGR 603 of MFL 111 and WGR 120 of RN 103 were described as being a WGRs, they can, more generally, be implemented using any type of multiplexer/demultiplexer whose passbands move together in frequency as a comb with temperature changes wavelength selecting waveguides (WSW), such as a reflecting grating multiplexer/demultiplxer. What has been described is merely illustrative of the application of the principles of the present invention. Other arrangements and methods can be implemented by those skilled in the art without departing from the spirit and scope of the present invention.

Appendix

REFERENCES

[1] C. R. Giles, R. D. Feldman, T. H. Wood, M. Zirngibl, G. Raybon, T. Strasser, L. Stulz, A. McCormick, C. H. Joyner, and C. R. Doerr, "Access PON using downstream 1550-nm WDM routing and upstream 1300-nm SCMA combining through a fiber-grating router," *IEEE Photon. Technol. Lett.*, vol 8, no. 11, pp. 1549–1551, 1996.

[2] M. Zirngibl, B. Glance, L. Stulz, C. H. Joyner, G. Raybon, and I. P. Kaminow, "Characterization of a multiwavelength waveguide grating router laser," *IEEE Photon. Technol. Lett.*, vol 6, no. 3, pp. 1082–1084, 1994.

[3] M. Zirngibl, C. H. Joyner, L. Stulz, C. Dragone, H. M. Presby, and I. P. Kaminow, "LARNet, a local access router network," *IEEE Photon. Technol. Lett.*, vol 7, no. 2, pp. 215–217, 1995.

[4] R. Giles, M. Zirngibl, "Multi-channel stabilization of an integrated WDM laser transmitter through correlation feed-back," submitted in *IEEE Photon. Technol. Lett.*

[5] R. Giles and S. Jiang, "Fiber grating sensor for wavelength tracking in single-fiber WDM access PON's," *IEEE Photon. Technol. Lett.*, vol 9, no. 4, pp. 523–525, 1997.

[6] R. Monnard, C. R. Doerr, C. H. Joyner, M. Zirngibl, and L. W. Stulz, "Direct modulation of a multifrequency laser up to 16×622 Mb/s," *IEEE Photon. Technol. Lett.*, Vol. 9, No. 6, pp. 815–817, June 1997.

[7] C. R. Doerr and C. H. Joyner, "Double-chirping of the waveguide grating router," *IEEE Photon. Technol. Lett.*, Vol. 9, No. 6, June 1997.

[8] D. Mayweather, L. Kazovsky, M. Downs, and N. Frigo, "Wavelength tracking of a remote WDM Router in a passive optical network," *IEEE Photon. Technol. Lett.*, vol 8, no. 9, pp. 1238–1240, 1996.

We claim:

1. A Wavelength Division Multiplexed (WDM) communication system comprising
   WDM transmitter unit including
      a temperature-sensitive multifrequency laser (MFL) for transmitting a multifrequency laser signal over an optical facility, and
      a temperature controller for controlling the temperature of the MFL in response to a power level signal received over a facility from a WDM receiver unit; and
   said WDM receiver unit including a WDM demultiplexer apparatus comprising
      a first input port of the demultiplexer for receiving a WDM signal having a plurality of wavelength signals, each wavelength being demultiplexed by the demultiplexer and outputted at a separate first type output port of a plurality of first type output ports,
      a second input port of the demultiplexer arranged to communicate a preselected wavelength signal to a second type output port and
      wherein a preselected one of the plurality of first type output ports is connected to the second type output port, so that a preselected wavelength signal received at the selected first type output port is outputted from the second input port; and
      a power detector for receiving the preselected wavelength signal detecting its power level and for sending the received power level signal to the WDM transmitter unit.

2. The WDM communication system of claim 1 wherein the WDM demultiplexer is a Waveguide Grating Router (WGR).

3. The WDM communication system of claim 1 wherein the MFL contains a Waveguide Grating Router (WGR).

4. The WDM communication system of claim 1 wherein the temperature controller includes a temperature-control algorithm for controlling the temperature of the MFL as a function of the received power at a Waveguide Grating Router (WGR) of the WDM receiver unit.

5. The WDM communication system of claim 1 wherein the temperature-control algorithm changes the temperature of MFL in a first direction in response to a received power level signal, the temperature of MFL is changed in the first direction as long as the received power level at WDM receiver unit is increasing, and when the received power level at WDM receiver unit falls, the temperature change of MFL is reversed to raise the received power level at WDM receiver unit.

6. The WDM communication system of claim 5 wherein the received power level signal from the WDM receiver unit is sent as a function of time or is sent when a predetermined power level change has occurred at the WDM receiver unit.

7. The WDM communication system of claim 1 wherein the power level signal is sent to the WDM transmitter unit over said facility.

8. The WDM communication system of claim 1 wherein the power level signal is sent to the WDM transmitter unit over a second facility.

9. The WDM communication system of claim 1 including a plurality of WDM receiver units, said controller receiving power level signal from each of the plurality of WDM receivers and sending them to the WDM transmitter unit.

10. The WDM communication system of claim 9 wherein said power detector is located separately from said plurality of WDM receivers.

11. The WDM communication system of claim 9 wherein said power detector is located at one of said plurality of WDM receivers.

12. A method of operating a Wavelength Division Multiplexed (WDM) communication system comprising the steps of:
   at a WDM transmitter unit
      controlling the temperature of a temperature sensitive multifrequency laser (MFL) in response to a power level signal received over a facility from a WDM receiver unit; and
   at a WDM receiver unit including a waveguide grating router (WGR)
      receiving a WDM signal at a first input port of the WGR,
      outputting each demultiplexed wavelength at a separate first type output port of a plurality of first type output ports of the WGR,
      receiving, at a second type output port of the WGR, a preselected wavelength signal from a preselected one of the plurality of first type output ports, the WGR being arranged to communicate the preselected wavelength signal to a second input port of the WGR; and
   at a power detector
      detecting the power level of the communicated preselected wavelength signal at the second input port and
      sending the received power level signal to the WDM transmitter unit.

13. A remote optical node for use in a Wavelength Division Multiplex (WDM) system including a transmitter unit and at least one optical network unit, the remote optical node comprising
   (i) a Waveguide Grating Router (WGR) apparatus including
      a first input port of the WGR for receiving from the transmitter unit a WDM signal having a plurality of wavelengths signals, each wavelength being demultiplexed by the WGR and outputted at a separate first type output port of a plurality of first type output ports, and wherein each of the at least one optical network unit is connected to a separate port of the ilurality of first type output ports,
      a second input port of the WGR arranged to communicate a preselected wavelength signal to a second type output port and
      wherein an unconnected extra port of the plurality of first type output ports is connected back to the second type output port, so that a preselected wavelength signal of said WDM signal received at the selected first type output port is outputted from the second input port and (ii) a power detector for receiving the preselected wavelength signal, detecting its power level, and sending a received power level signal to the transmitter unit.

14. The WGR apparatus of claim 13 further comprising means for measuring the power level of the preselected wavelength signal outputted from the second input port.

15. The WGR apparatus of claim 14 further comprising a transmitter for communicating the power measurement to another apparatus.

16. The WGR apparatus of claim 14 wherein the power level measuring is done as a function of time or after a predetermined power level change has occurred at the WGR apparatus.

17. A method of detecting frequency drift at a Waveguide Grating Router (WGR) apparatus, comprising the steps of receiving a Wavelength Division Multiplexed (WDM) signal at a first input port of the WGR, outputting each demultiplexed wavelength at a separate first type output port of a plurality of first type output ports of the WGR, outputting a preselected wavelength signal from an extra first type output port which is not one of said plurality of first type output ports of the WGR, the preselected wavelength signal being one of the demultiplexed wavelengths of the WDM signal, receiving, at a second type output port of the WGR, the preselected wavelength signal, the WGR being arranged to communicate the preselected wavelength signal to a second input port of the WGR, detecting the power level of the communicated preselected wavelength signal at the second input port and comparing the detected power level against a prior power level reading to determine frequency drift.

* * * * *